United States Patent

Winkler et al.

[15] 3,668,989
[45] June 13, 1972

[54] CAMERA OPERATING DEVICE

[72] Inventors: Alfred Winkler; Anton Theer, both of Munich; Johann Zanner, Unterhaching; Fridolin Hennig, Munich, all of Germany

[22] Filed: Aug. 6, 1970

[21] Appl. No.: 61,598

[30] Foreign Application Priority Data

Aug. 16, 1969 Germany........................P 19 41 752.8

[52] U.S. Cl..............................95/11 R, 95/31 EL, 95/44, 352/140, 352/178
[51] Int. Cl. ...................................................G03b 19/00
[58] Field of Search ..................95/11 R, 31 EL, 44, 45; 352/139, 140, 178

[56] References Cited

UNITED STATES PATENTS

| 3,376,094 | 4/1968 | Baginski | 352/178 X |
| 3,502,013 | 3/1970 | Shimoda | 95/31 |
| 3,183,520 | 5/1965 | Schaefer | 352/178 |

FOREIGN PATENTS OR APPLICATIONS

| 1,448,801 | 7/1966 | France | 352/140 |
| 195,252 | 5/1957 | Austria | 352/178 |

Primary Examiner—Samuel S. Matthews
Assistant Examiner—Robert P. Greiner
Attorney—Michael S. Striker

[57] ABSTRACT

A still camera or motion picture camera wherein a wall of the housing has an opening for a frame which is movable in the plane of such wall and surrounds a diaphragm which is deformable to actuate the shutter. Movements of the frame with reference to the wall are used to actuate one or more additional switches which control the motor for a zoom lens, to open or complete the circuit of an exposure meter, to initiate or terminate a fading operation, to effect rewinding of film and/or to initiate or terminate other operations in the camera. The frame can perform rotary, pendulum, reciprocatory and/or other movements with reference to the housing.

18 Claims, 6 Drawing Figures

PATENTED JUN 13 1972 3,668,989
SHEET 1 OF 2
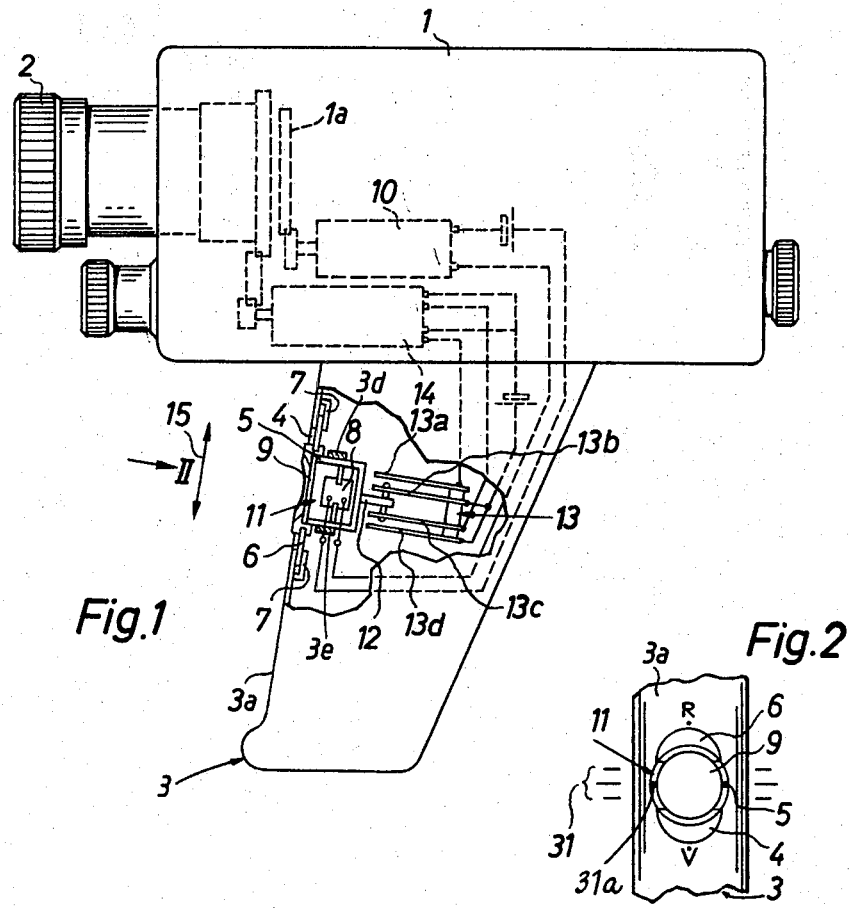
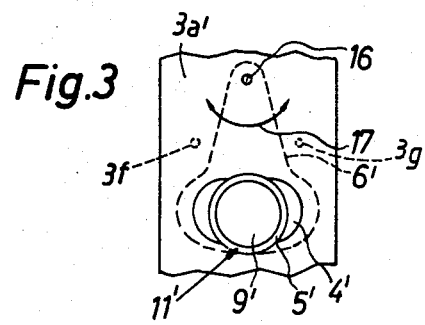
INVENTOR
ALFRED WINKLER
ANTON THEER
JOHANN ZANNER jun.
FRIDOLIN HENNIG
BY INVENTOR
ALFRED WINKLER
ANTON THEER
JOHANN ZANNER jun.
FRIDOLIN HENNIG 3,668,989

CAMERA OPERATING DEVICE

CROSS-REFERENCE TO RELATED APPLICATIONS

The camera operating device of the present invention constitutes a further development of and an improvement over the devices disclosed in the copending applications, Ser. Nos. 749,170 (filed July 31, 1968 by Winkler et al.), 857,168 and now abandoned, (filed Sept. 11, 1969 by Winkler), 16,306 (filed Mar. 4, 1970 by Kremp et al.) and 20,274 now U.S. Pat. No. 3,603,228 (filed March 17, 1970 by Kremp et al.), which are assigned to the owner of the present application.

BACKGROUND OF THE INVENTION

The present invention relates to photographic apparatus in general, and more particularly to improvements in operating devices for still cameras or motion picture cameras. Still more particularly, the invention relates to improvements in camera operating devices of the type wherein the exposures are made in response to deformation of a diaphragm which performs the function of a camera release.

The aforementioned copending applications disclose camera operating means of the type wherein a diaphragm undergoes deformation in order to start a motor, to open the shutter and/or to perform another function which is necessary in the operation of a still camera or motion picture camera. It was found that such camera operating means is eminently satisfactory for making of exposures without camera shake, i.e., for making of exposures with the camera held by hand when the shutter furnishes a relatively long exposure time.

SUMMARY OF THE INVENTION

An object of the invention is to provide a novel and improved camera operating device which embodies a diaphragm and is more versatile than presently known operating devices.

Another object of the invention is to provide a camera operating device which can be installed in presently known still cameras or motion picture cameras.

A further object of the invention is to provide a camera operating device wherein a single readily accessible part, particularly a diaphragm, requires deformation and/or displacement in order to start or terminate two or more operations which must be carried out in normal manipulation of the camera and/or for the production of special effects.

An additional object of the invention is to provide a camera operating device which is of compact design, which comprises a relatively small number of simple parts, which requires no major alterations in the design and/or operation of presently known photographic apparatus, and which can be readily manipulated by beginners, advanced amateur photographers or highly skilled professionals.

Still another object of the invention is to provide a camera operating device which is sufficiently sturdy to warrant its use in nearly all types of photographic apparatus.

The invention is embodied in a photographic apparatus comprising a housing including a wall (which can form part of the body or of the handle of the camera housing), a structural unit including a deformable diaphragm and a frame supporting the diaphragm and reciprocable, rotatable, pivotable, swingable and/or otherwise movable therewith between several positions with reference to and in the general plane of the wall, at least one first camera assembly (e.g., a shutter) which is actuatable in response to deformation of the diaphragm in at least one position of the unit with reference to the wall, and at least one second camera assembly (e.g., a motor for the zoom lens, an exposure control or a fading mechanism) which is actuatable in response to movement of the unit with reference to the wall. Thus, the user of the camera can deform the diaphragm in order to start the shutter and the user can simultaneously shift the diaphragm and the entire unit with reference to the wall of the camera housing to thus initiate or terminate the operation of one or more second camera assemblies. Each such camera assembly may include one or more switches which open or close in response to deformation of the diaphragm or in response to movement of the unit with reference to the wall. The arrangement may be such that the diaphragm can open or close one or more switches only when the unit assumes one or more predetermined positions with reference to the wall.

The novel features which are considered as characteristic of the invention are set forth in particular in the appended claims. The improved camera operating device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a schematic side elevational view of a motion picture camera provided with an operating device which embodies one form of the invention.

FIG. 2 is a front elevational view of the handle and of the operating device in the camera as seen in the direction of arrow 11 in FIG. 1;

FIG. 3 is a similar front elevational view of a portion of a second handle which is provided with a modified operating device;

DESCRIPTION OF THE PREFERRED EMBODIMENTS

Figure 4:
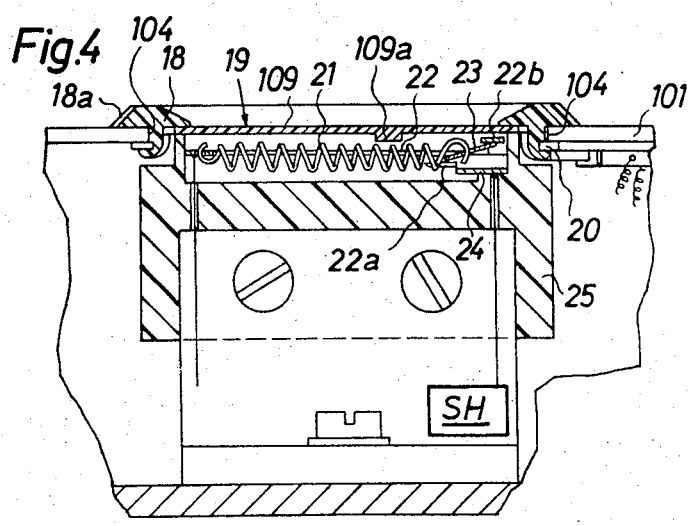
FIG. 4 is a central sectional view of a third camera operating device.

Referring first to FIGS. 1 and 2, there is shown a motion picture camera for use with 8-millimeter film which comprises a housing including a main portion or body 1 and a pistol grip handle 3 which extends downwardly and forwardly from the bottom wall of the body 1. The front wall of the body 1 supports a zoom lens 2 which can be moved axially forwardly or backwards in response to starting of a reversible electric motor 14. A second electric motor 10 in the body 1 is used to rotate the shutter 1a and to operate the customary film transporting mechanism, e.g., a conventional claw pulldown, not shown.

The front wall 3a of the handle 3 is provided with an elongated straight guide slot or opening 4 having rounded upper and lower end portions (see FIG. 2) and accommodating a circular or ring-shaped frame 5 for a deformable diaphragm 9. The frame 5 is mounted on a plate-like carrier 6 which is located behind the slot 4 and is movable up and down, lengthwise of the slot, to the extent determined by suitable upper and lower stops (not specifically shown in the drawing). The directions in which the carrier 6 and frame 5 are movable as a unit are indicated in FIG. 1 by a double-headed arrow 15. The carrier 6 is movable in guide rails 7 provided at the inner side of the wall 3a. The frame 5 extends rearwardly or inwardly of the carrier 6 and contains a microswitch 8 which is actuated in response to deformation of the diaphragm 9. The numeral 11 denotes a structural unit which includes the frame 5, the carrier 6, the diaphragm 9 and the microswitch 8; this unit is movable in the directions indicated by the arrow 15. The microswitch 8 is in circuit with the motor 10 to start the shutter and to operate the film transporting mechanism in response to deformation of the diaphragm 9 upon the application of finger pressure in the direction indicated by the arrow II. The parts 1a, 10, 8 together form a first camera assembly which is actuated in response to deformation of the diaphragm 9.

The innermost or bottom part of the frame 5 is provided with a projection or extension 12 which constitutes a trip or actuating means for a two-way switch 13 including upper contacts 13a, 13b and lower contacts 13c, 13d. When the unit 11 is moved upwardly, as viewed in FIG. 1 or 2, the trip 12 engages the contact 13b with the contact 13a to start the reversible motor 14 in a direction to move the objective lens 2 rearwardly. On movement of the unit 11 in the opposite direction (downwardly), the trip 12 engages the contact 13c with the contact 13d to again start the reversible motor 14 but in a direction to move the lens 2 forwardly. Thus, the motor 14 can change the focus by the simple expedient of manually moving the unit 11 up or down. The motor 14 comes to an immediate stop when the unit 11 is returned to the illustrated central or neutral position. The parts 13, 14, 2 constitute a second camera assembly which is actuated in response to movement of the unit 11 with reference to the wall 3a.

It will be noted that the user of the camera can effect a forward or rearward movement of the lens 2 simultaneously with the taking of pictures and that such operations necessitate the use of a single finger which engages the diaphragm 9 to maintain the microswitch 8 in closed position (the motor 10 running) and which can also shift the unit 11 up or down and back to neutral or central position when the lens 2 assumes a desired axial position. The selected axial position of the lens 2 remains unchanged as long as the unit 11 remains in neutral position irrespective of the condition of the diaphragm 9.

As stated above, the end positions of the unit 11 can be determined by suitable stops (not shown); it is, however, equally possible to employ the front wall 3a as a stop, i.e., to dimension the slot 4 in the wall 3a in such a way that the contact 13b engages the contact 13a when the concave surface at the upper end of the slot 4 prevents further upward movement of the frame 5, and that the contact 13c engages the contact 13d when the concave surface at the lower end of the slot 4 prevents further downward movement of the frame 5. The median or neutral position of the unit 11 can be determined by a suitable detent structure, for example, one employing one or more spring-biased balls in the front wall 3a and a requisite number of sockets in the frame 5. It is also possible to provide the handle 3 with two springs which bias the frame 5 and/or the carrier 6 in opposite directions in such a way that their forces neutralize each other when the unit 11 assumes its median position. Such arrangement is especially advantageous because the unit 11 automatically returns to median position when the user's finger is removed from the diaphragm 9 and/or frame 5. The characters 3d, 3e shown in FIG. 1 denote two leaf springs which respectively bias the frame 5 downwardly and upwardly and neutralize each other in median position of the unit 11, i.e., when the contacts 11b, 11c are respectively disengaged from the contacts 13a, 13d so that the motor 14 is idle. The springs 3d, 3e can be said to constitute a simple detent means for the unit 11.

A scale 31 on the wall 3a facilitates immediate determination of the position of the unit 11 with reference to the handle 3. The frame 5 has an index 31a which can be placed into registry with a selected graduation of the scale 31. The symbols "R" and "V" (shown in FIG. 2) respectively indicate that the lens 2 moves rearwardly when the unit 11 is lifted and that the lens 2 moves forwardly when the unit 11 is moved downwardly.

FIG. 3 illustrates a modification of the structure shown in FIGS. 1 and 2. The unit 11' is analogous to the unit 11; however, its carrier 6' is pivoted to the wall 3a' by a pin or shaft 16. The slot 4' is of arcuate shape to permit pendulum movements of the frame 5' for the diaphragm 9'. The arrow 17 indicates the directions in which the carrier 6' can swing about the axis of the pin 16 to close the contacts 13a, 13b, or 13c, 13d of the switch 13 (not shown in FIG. 3). The stops on the wall 3a' for the carrier 6' of the unit 11' are shown at 3f and 3g. The microswitch in the frame 5' is activated in response to deformation of the diaphragm 9' to thereby start the motor 10.

Figure 5:
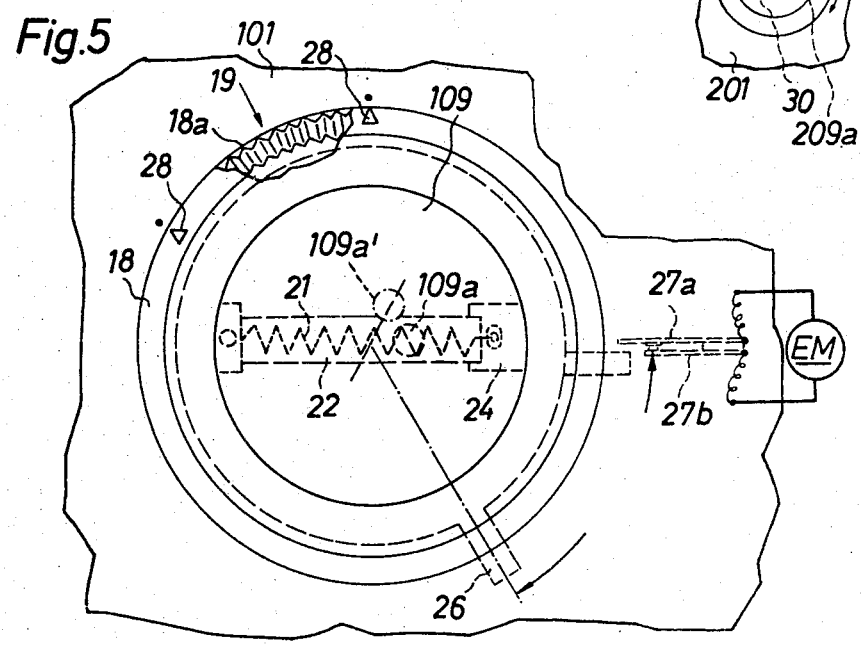
FIG. 5 is a plan view of the structure shown in FIG. 4.

Referring to FIGS. 4 and 5, there is shown a diaphragm 109 whose marginal portion is secured to a frame 18 to form therewith a structural unit 19 which is rotatable in the wall 101 of the camera housing (either in the body or in the handle). The wall 101 has a guide portion 104 which confines the frame 18 to angular movement. The exposed surface of the frame 18 is knurled, milled, serrated, toothed or otherwise roughened, as at 18a, to facilitate rotation of the unit 19 with reference to the wall 101. The frame 18 is provided with suitable projections (not shown) which engage the marginal portion of the diaphragm 109 and insure that the frame turns in response to rotation of the diaphragm or vice versa. A detachable ring 20 holds the frame 18 in the guide portion 104 and permits rapid removal of the unit 19.

The space behind the diaphragm 109 contains a snap-over helical spring 21 which forms part of an electric switch having a fixed contact 24 and a movable contact 23 connected to the spring 21. The switch further includes contacts 22, 22a, 22b and is mounted on an insulating support 25 of the camera housing. When an eccentric protuberance 109a of the diaphragm 109 causes the spring 21 to snap over, the contact 23 engages the contact 24 to complete the circuit of an electric or electronic shutter SH whereby the shutter opens to admit scene light to an unexposed film frame. In order to prevent accidental opening of the shutter SH, the unit 19 can be moved to a different angular position in which the eccentric protuberance 109a of the diaphragm 109 is out of alignment with the spring 21.

One such position of the protuberance 109a is shown in FIG. 5 by phantom lines, as at 109a'; when the diaphragm 109 is deformed while the protuberance assumes the position 109a' or an analogous position, the protuberance bypasses the spring 21 and the shutter SH remains closed.

The construction of the switch including the spring 21 and contacts 22, 22a, 22b, 23, 24 is substantially identical with that of the switch which is disclosed in the aforementioned copending application, Ser. No. 16,306.

FIG. 5 further shows a normally closed switch having contacts 27a, 27b which is connected in the circuit of an exposure meter EM. In order to save energy when the camera is not in use, the switch including the contacts 27a, 27b can be opened in response to movement of the unit 19 to at least one predetermined angular position. To this end, the frame 18 has a radially outwardly extending portion or arm 26 which engages the contact 27a and moves it away from the contact 27b to thus open the circuit of the exposure meter EM when the unit 19 is turned in a counterclockwise direction, as viewed in FIG. 5. Thus, the unit 19 can serve an additional purpose, namely, of conserving the energy source which supplies current to the exposure meter EM.

The frame 18 is provided with indices 28 which can be moved into registry with appropriate graduations or other symbols on the wall 101 to indicate the angular position of the unit 19 so that the user knows whether or not the circuit of the exposure meter EM is completed and whether or not the protuberance 109a of the diaphragm 109 is in requisite angular position to actuate the switch on the insulating support 25. The arrangement is preferably such that the circuit of the exposure meter EM is open when the protuberance 109a is out of register with the spring 21.

Figure 6:
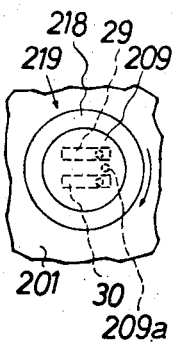
FIG. 6 is a front elevational view of a further camera operating device.

FIG. 6 shows a portion of a motion picture camera wherein the protuberance 209a of the diaphragm 209 can close one of two switches 29, 30 at a time. When the unit 219 (including the frame 218) assumes the illustrated neutral position in which the protuberance 209a is located between the switches 29, 30, a deformation of the diaphragm 209 in a direction at right angles to the plane of FIG. 6 will fail to effect actuation of the switch 29 or 30. In another angular position of the unit 219 with reference to the wall 201, the protuberance 209a can actuate the switch 29 and in a further position the switch 30. The wall 201 is provided with suitable graduations (not shown) which explain various angular positions of the unit 219. The switch 29 can be employed to cause the camera motor to open the shutter at desired intervals so that the user can make individual exposures. The other switch 30 is closed when the motor is to rapidly advance the film past the film gate, for example, at 16 or 24 frames per second. It is clear that these switches can be used with equal advantage to initiate certain other operations of the camera, for example, to produce fade-out and fade-in effects.

All embodiments of the improved camera operating device share the feature that the structural unit including the diaphragm is mounted in a wall of the camera housing (either in the body or in the handle) and is movable in the general plane of such wall to thereby initiate or terminate one or more additional operations. As explained above, reciprocatory, oscillatory, pendulum or angular movements of the unit may initiate or terminate the movements of a zoom lens or the operation of a fading means in a motion picture camera. In a still camera, such movements of the structural unit which embodies the diaphragm can be used to start or terminate the transport of film back into the supply cartridge, to connect or disconnect the exposure meter from an energy source (this is equally useful in motion picture cameras), and/or to terminate or initiate certain other operations. The outwardly extending portion of the frame protects the diaphragm against accidental deformation and renders it possible to readily locate the diaphragm in a dark area or without looking away from the subject or scene. The frame extends only slightly beyond the outer side of the supporting wall.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic apparatus, a combination comprising a housing including a wall; a structural unit including a deformable diaphragm and a frame supporting said diaphragm, said unit being movable between several positions with reference to and in the general plane of said wall whereby said diaphragm shares all movements of said frame; at least one first camera assembly actuatable in response to deformation of said diaphragm; and at least one second camera assembly actuatable in response to movement of said unit with reference to said wall, said diaphragm being deformable by a single finger of the user of the photographic apparatus simultaneously with as well as independently of the movement of said unit with reference to said wall by such single finger.

2. A combination as defined in claim 1, wherein said wall is provided with guide means for said unit.

3. A combination as defined in claim 1, wherein said second camera assembly includes at least one electric switch arranged to move between open and closed positions in response to movement of said unit with reference to said wall.

4. A combination as defined in claim 3, wherein said unit includes at least one trip for activating said switch.

5. A combination as defined in claim 1, wherein said unit is reciprocable with reference to said wall and said housing comprises guide means for confining said unit to reciprocating movement.

6. A combination as defined in 1, wherein said unit is movable with reference to said wall along an arcuate path and said housing comprises guide means defining said arcuate path.

7. A combination as defined in claim 1, wherein said unit further comprises a carrier and said housing is provided with guide means for confining said carrier to movement along a predetermined path with reference to said wall.

8. A combination as defined in claim 7, wherein said guide means comprises two mirror symmetrical halves.

9. A combination as defined in claim 1, wherein said unit is rotatable with reference to said housing about a predetermined axis.

10. A combination as defined in claim 9, wherein said frame is of circular outline and the axis of said frame coincides with said predetermined axis.

11. A combination as defined in claim 1, wherein said diaphragm is provided with at least one protuberance arranged to actuate said first camera assembly in response to deformation of the diaphragm in at least one position of said unit with reference to said wall and to be inoperative in response to deformation of the diaphragm in at least one second position of said unit with reference to said wall.

12. A combination as defined in claim 1, wherein said first camera assembly comprises a plurality of switches each actuatable in response to deformation of said diaphragm in a different position of said unit with reference to said wall.

13. A combination as defined in claim 1, wherein each of said camera assemblies comprises a motor.

14. A combination as defined in claim 1, wherein one of said camera assemblies comprises a shutter.

15. A combination as defined in claim 1, wherein said housing comprises a body portion and a handle portion and wherein said wall forms part of one of said portions.

16. A combination as defined in claim 1, wherein said first camera assembly comprises a microswitch.

17. A combination as defined in claim 1, further comprising detent means for releasably holding said unit in a predetermined position with reference to said wall.

18. A combination as defined in claim 1, further comprising means for biasing said unit to a predetermined position with reference to said wall.

* * * * *